March 26, 1968  A. S. LIGHTSEY  3,374,886
GRAIN SEPARATOR CHAFFER ASSEMBLY
Filed May 2, 1966  2 Sheets-Sheet 1
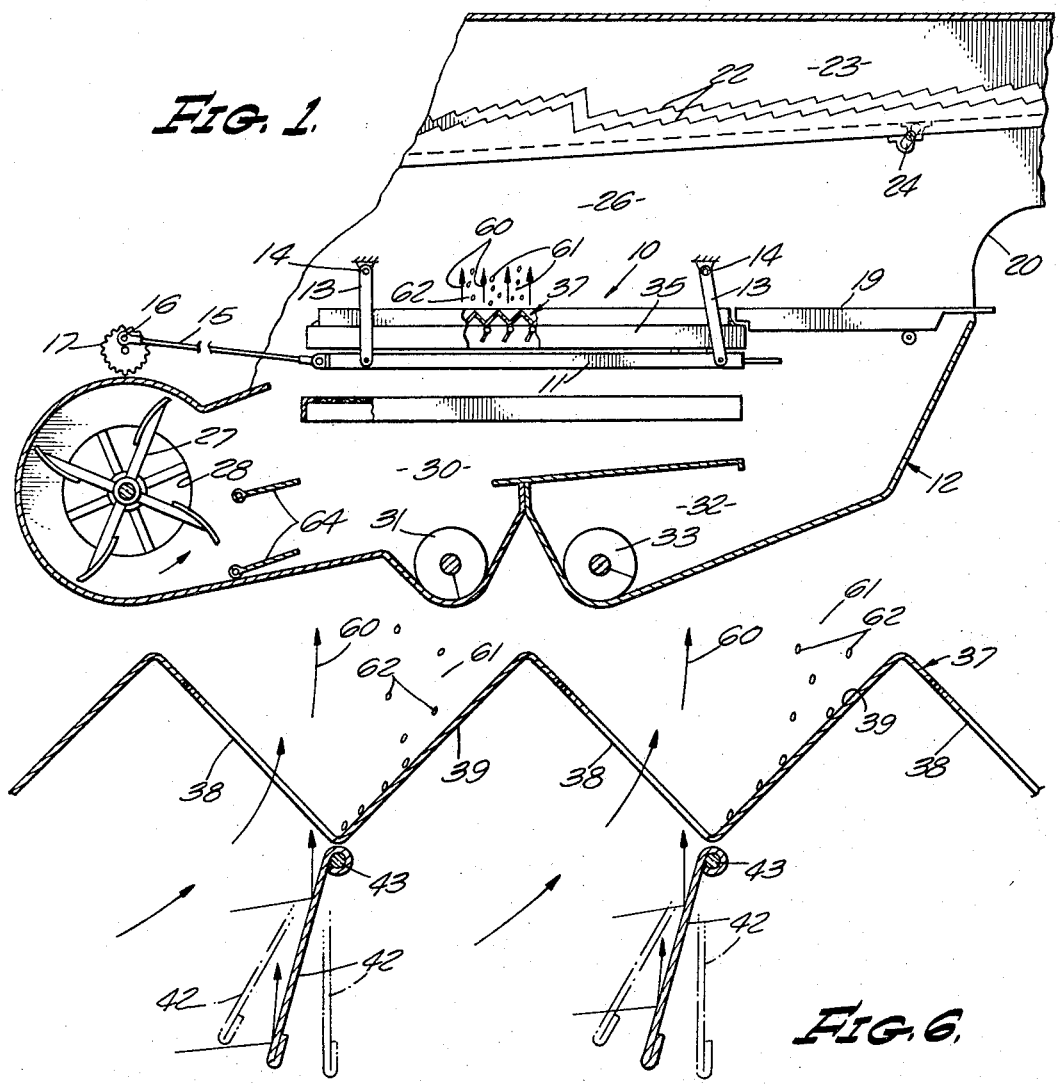
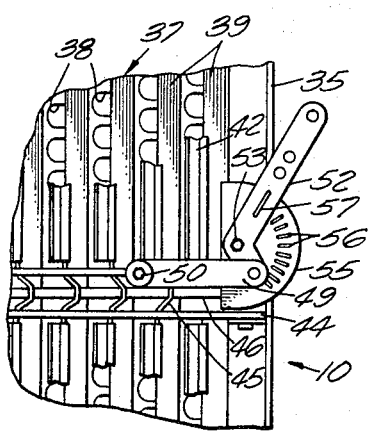
INVENTOR.
ARTHUR S. LIGHTSEY
BY
ATTORNEY March 26, 1968  A. S. LIGHTSEY  3,374,886
GRAIN SEPARATOR CHAFFER ASSEMBLY
Filed May 2, 1966  2 Sheets-Sheet 2

INVENTOR.
ARTHUR S. LIGHTSEY
BY
ATTORNEY

United States Patent Office 3,374,886
Patented Mar. 26, 1968

3,374,886
GRAIN SEPARATOR CHAFFER ASSEMBLY
Arthur S. Lightsey, Cantua Creek, Calif.
(1280 Allen Ave., Oakdale, Calif. 95361)
Continuation-in-part of application Ser. No. 346,719,
Feb. 24, 1964. This application May 2, 1966, Ser.
No. 546,914
2 Claims. (Cl. 209—28)

ABSTRACT OF THE DISCLOSURE

A chaffer assembly for combines and grain separators formed from corrugated material having rows of air inlet openings so arranged relative to adjustable air deflectors as to provide closely spaced sheet-like generally vertical streams of air flowing upward through the stream of chaff and straw passing rearwardly over the top of the chaffer assembly. The rising streams of air do not tend to blow the grain toward the rear end of the chaffer assembly and the relatively quiet air between the vertically rising air streams allows the grain to fall and pass through the air inlet openings into the grain collecting chamber below the chaffer assembly.

---

This application is a continuation-in-part of my copending application for United States Letters Patent Ser. No. 346,719, filed Feb. 24, 1964, entitled, "Grain Separator Chaffer Assembly," and now abandoned.

This invention relates to grain separators and more particularly to an improved chaffer assembly having as its object the provision of a simpler, more rugged, easily controlled device for agitating and levitating a stream of straw and chaff while passing rearwardly thereacross, and for creating and utilizing rising, spaced-apart sheets of air extending crosswise of the stream of straw flow to facilitate the gravitation of grain and the escape thereof through the chaffer assembly.

As is well known, grain separators include various components in their forward portions for feeding and buffeting stalks and attached heads of grain for the purpose of breaking open the grain-carrying husks. Thereafter, the problem is to separate the free grain from the straw and chaff as the latter is being discharged from the separator in a stream of air. During this final separating operation, the straw is advanced rearwardly over mechanically driven walker devices as the grain, chaff and portions of the straw fall therethrough and are carried rearwardly over a chaffer assembly under conditions intended to separate the grain for passage downwardly through the chaffer into collecting chambers therebelow.

There have been many proposals for chaffer assemblies having various arrangements for passing jets of air upwardly into the straw and grain to agitate the latter and facilitate the separation of the grain. Many of these proposals include provision for adjusting the size of the air openings and the quantity of the air passing upwardly therethrough. However, as is well known to those skilled in this art, these prior constructions are quite sensitive to a wide range of factors and provide efficient separation under certain operating conditions but highly unreliable and inefficient separation under slightly different conditions with the result that excessive portions of the grain are lost and carried away in the straw discharging from the separator.

Accordingly, it is a primary purpose of the present invention to provide an improved chaffer assembly to separate grain from straw and chaff and featuring provision for a plurality of thin, vertically directed streams of air extending crosswise of the separator and spaced from one another sufficiently to provide relatively quiescent air spaces therebetween for the gravitation of grain downwardly onto imperforate surfaces of the chaffer assembly and through the air inlet openings. These spaced-apart rising streams or sheets of air issue upwardly through the chaffer at an acute angle to imperforate wall portions of the chaffer and cooperate with these walls in creating low pressure areas in these grain flow spaces. Of importance is the fact that these air streams do not pass in contact with the aforementioned imperforate surfaces. In consequence, the air streams are not effective to project the grain over the crests of the chaffer corrugations toward the separator exit but, on the contrary, create low pressure areas and a freer path for the downward gravitation of the grain therealong.

An important feature of the chaffer assembly, according to the present invention, is the provision therebelow of air-directing means for guiding the rising streams of air through the chaffer openings and along a vertical path inclined to the above-mentioned imperforate walls. Desirably, the air-directing means are adjustable to accommodate the chaffer for most efficient use with a wide range of grain sizes and weights. However, it is found that a single setting of the air-directing means suffices to handle grain of a wide variety of kinds and sizes since the principal purpose and function of the air-directing means is to avoid having the air streams wipe across and in contact with the imperforate walls of the corrugations, but instead to flow in definite spaced-apart relation to one another and at an acute angle to these surfaces to create low pressure zones thereabove.

Accordingly, it is a primary object of the present invention to provide an improved chaffer assembly for use in grain separators and characterized by its simplicity, ruggedness, effectiveness, and ability to handle a wide range of kinds of grain with equal efficiency.

Another object of the invention is the provision of a chaffer assembly for grain separators featuring a transversely corrugated surface one side wall of which corrugations are provided with a row of closely spaced, large-area openings and the other side of which is imperforate together with means for directing generally vertical streams of air upwardly through the openings and spaced from one another to provide relatively quiescent air spaces between adjacent streams through which grain gravitates onto the imperforate walls and through the air openings.

Another object of the invention is the provision of a chaffer assembly featuring a transversely corrugated surface alternate sides of which are provided with rows of openings together with adjustable air-deflector means therebeneath effective to direct air upwardly through the openings in thin, generally vertical sheets spaced from one another and out of wiping contact with imperforate surfaces of the corrugations.

These and other more specific objects will appear upon reading the following specification and claims and upon considering in connection therewith the attached drawings to which they relate.

Referring now to the drawings in which a preferred embodiment of the invention is illustrated:

FIGURE 1 is a fragmentary longitudinal sectional view through the separator chamber of a grain separator showing one preferred embodiment of the invention chaffer assembly in position therein;

FIGURE 3 is a fragmentary bottom plan view on an enlarged scale of the air-deflector adjusting means.

FIGURE 6 is a fragmentary enlarged sectional view taken crosswise of several corrugations of the chaffer assembly under operating conditions.

Figure 2:
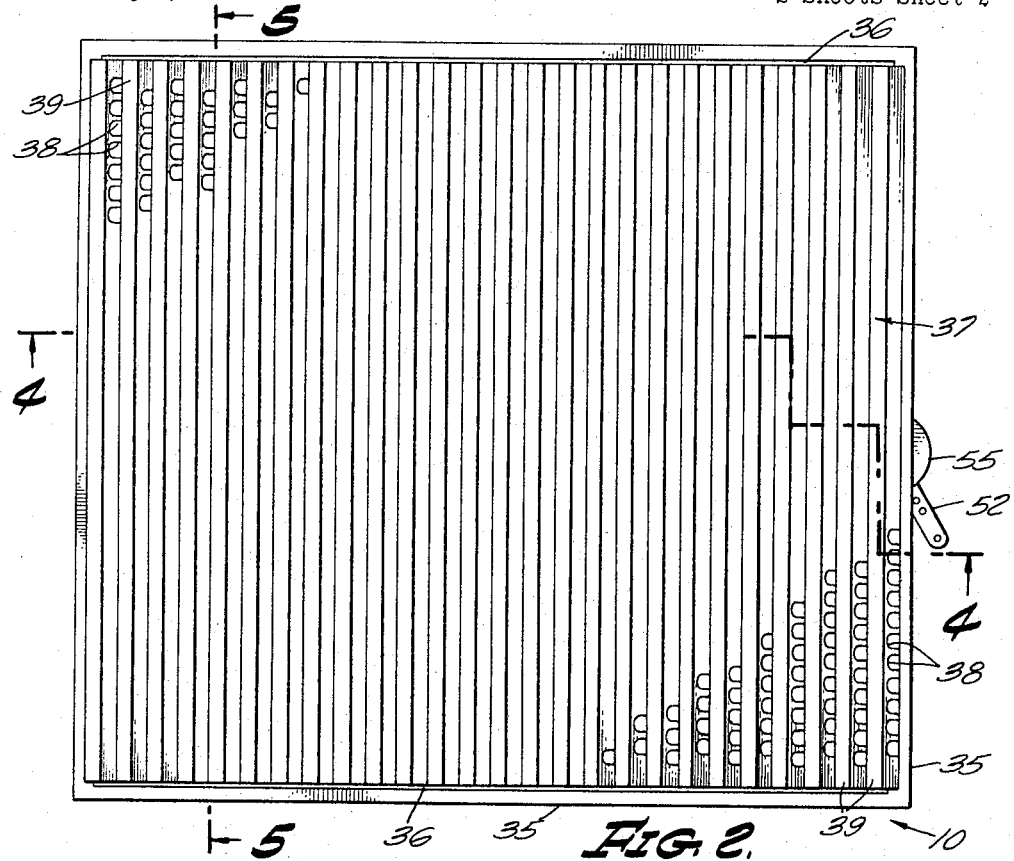
FIGURE 2 is a top plan view of the chaffer assembly per se.

Referring more particularly to FIGURE 1, there is shown a preferred embodiment of the invention chaffer assembly, designated generally 10, mounted on a pair of shoes 11 along either interior side of the rear end of grain separator 12. Shoes 11 are suspended from links 13 having their upper ends pivoted at 14 to the sides of the separator housing. Shoes 11 are reciprocated to and fro through a short path by connecting rod 15 connected to a drive pin 16 carried by the face of a driven gear 17. It wil l be understood that chaffer asembly 10 is releasably secured to shoes 11 in any well known manner and that a tailings sieve 19 of any suitable construction bridges the gap between the rear end of chaffer 10 and the straw discharge opening 20 at the rear end of separator 12.

Overlying chaffer assembly 10 are a series of conventional straw walkers 22, 22 arranged parallel to one another and underlying the main straw passage along which straw flows to the right as viewed in FIGURE 1. Walkers 22 are mounted on cranks 24 which are rotated to drive alternate walkers in and out of phase relation whereby the sawteeth on their upper edges cooperate in advancing the straw to the right and out of the rear end of the separator. Grain, chaff and straw escaping between the walkers falls into space 26 overlying chaffer assembly 10 and tailings sieve 19, the grain being separated out as the straw and chaff continue to the right and out of discharge opening 20.

A fan 27 extending crosswise of the separator draws air in through openings 28 at the opposite ends of the fan chamber and directs this air rearwardly and upwardly through assembly 10 and tailings sieve 19. Full kernels of sound grain fall downwardly through the chaffer assembly into collecting chamber 30 and are removed by screw conveyor 31. The unthreshed heads, clusters and imperfect grains collect in chamber 32 and are removed therefrom by a screw or auger 33.

Referring now more particularly to FIGURES 2 to 6, there is shown details of a preferred embodiment of chaffer assembly 10 which includes a rigid perimeter frame 35 and upstanding flanges 36 extending along its opposite sides. Suitably secured, as by welding, to main frame 35 is a corrugated sheet metal cover 37 provided with deep corrugations extending the full width of the chaffer assembly and closed at their ends by flanges 36. The sides of each corrugation facing rearwardly toward the straw discharge opening 20 are formed with large-area, closely spaced air openings 38. As is best shown in FIGURE 2, the openings in one corrugation are staggered or offset laterally relative to the openings in the next adjacent corrugations. The opposite or forwardly facing sides 39 of each corrugation are imperforate and their lower edges merge with the lower straight edges of openings 38. As herein shown, the perforate and imperforate side walls of each groove lie at an angle of approximately 90 degrees to one another and at approximately 45 degrees to a vertical plane drawn through the bottom of the corrugation. However, it will be understood that these angular relationships are not critical and may be varied if desired.

It is important that the air from fan 27 be directed to flow generally vertically through each row of air openings 38 and out of contact with the imperforate side walls 39 of the corrugations. Simple means accomplishing this purpose as herein shown comprises air-deflecting vanes 42 extending crosswise of the underside of the chaffer assembly and closely adjacent the undersides of each corrugation trough. Vanes 42 are supported on shafts 43 journaled in notches opening through the upper edges of retainer strips 44 suitably secured to frame 35. The midportions of shafts 43 are provided with a crank 45 (FIGURE 5) seating in the bight portion thereof a rigid operating strip 46. This strip is provided with notches 47 in its lower edge accommodating the bight portion of each crank 45, and, as will be recognized, axial movement of strip 46 serves to pivot shafts 43 and the individual vanes 42 in unison with ons another.

Figure 4:
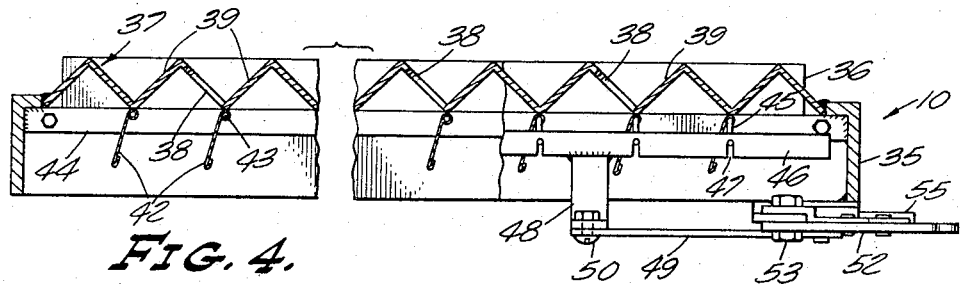
FIGURE 4 is a cross-sectional view on an enlarged scale taken along broken line 4—4 on FIGURE 2.
Figure 5:
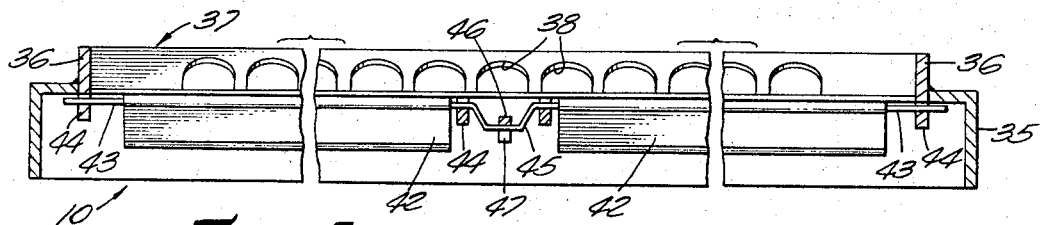
FIGURE 5 is a smiliar view to FIGURE 4 taken along line 5—5 on FIGURE 2.

Means for adjusting cranks 45 and thereby the position of the air deflectors 42 is best shown in FIGURES 3 and 4. This adjusting means includes a bracket 48 secured to the common operating strip 46 and pivotally connected at its lower end to a link 49 by a bolt 50. The righthand end of link 49, as viewed in FIGURE 3, is connected to the end of the shorter leg of a bell crank 52 pivotally supported on control sector 55 by a bolt 53. The longer leg of the bell crank projects from the rim of sector 55, firmly anchored to frame 35, and serves as an operating handle for the adjusting means. Sector 55 is formed with an arcuate row of detents 56 frictionally seating a bead 57 formed on the adjacent surface of bell crank 52 and effective to hold the vanes 42 in any desired adjusted position.

The operation of the described grain separating facility for a grain separator will now be described with particular reference to FIGURES 1 and 6. Unthreshed stalks of grain are subjected to thorough beating and buffeting in forward portions of the grain separator in a manner well known in this art. This material then discharges rearwardly onto the forward ends of straw walkers 22 where it is gradually worked to the rear along these walkers in a well known manner as grain, chaff and some straw falls into chamber 26 overlying chaffer assembly 10. There, the stream of material undergoing separation is agitated by a multiplicity of thin sheets of air rising vertically through the parallel rows of openings 38. Of importance is the fact that these separate sheet-like streams of air 60, as illustrated in FIGURES 1 and 6, are separated by intervening zones 61 of relatively quiescent air along which the grain 62 gravitates. These quiescent zones 61 overlie the imperforate side walls 39 of the chaffer assembly and have a width approximating the distance between adjacent sheets of air 60.

The above-described rising sheets of air and intervening zones of relatively quiescent air are of very considerable importance in the successful operation of a grain separator. Heretofore, it has been the practice to introduce the air through the chaffer in a direction inclined acutely to the horizontal and directed generally toward the rear discharge opening for the straw and chaff. While this arrangement is generally effective in agitating the chaff and straw, adjacent air streams are in direct contact and flowing transversely of the path of falling grain as well as in direct wiping contact with imperforate portions of the chaffer with the result that grain on or close to these surfaces is carried rearwardly and upwardly into the air stream. In this manner, considerable portions of the grain are carried out of the separator and lost. According to the present construction and its mode of operation, the rising sheets of air agitate the straw and chaff and keep it off the chaffer assembly and are separated from one another by an adequate distance for grain to gravitate downwardly onto the imperforate surfaces 39 and thence through openings 38 into the grain-receiving chambers 30, 32. No air wipes across the imperforate surfaces 39 but instead the rapidly rising streams of air cooperate with these surfaces in entraining air from zones 61 thereby to lower the air pressure therein and facilitating the downward passage of the grain.

Air-directing vanes 42 form an important role in the operation of the described assembly, as will be readily understood from FIGURE 6. Thus, these vanes deflect the air passing rearwardly from fan 27 and cause it to rise vertically through openings 38. It is found in practice that the position of the vanes shown in full lines in FIGURE 6 is highly effective and efficient in separating grain of a wide range of sizes and weights, the range of adjustment required under widely varying conditions being generally indicated by the dotted line showing of the vanes to either side of the full line position. As will be appreciated, the adjusted position and the width of the air deflectors varies with the design and arrangement of the adjacent components, the reciprocation speed at which the chaffer is operated, the volume and velocity of the air delivered to the underside of the chaffer assembly, and the like factors readily appreciated by those skilled in this art. The air volume and velocity can be controlled by any suitable means including the number and adjustment of the air-directing vanes 64 in the air plenum chamber, air-control valves for air inlets 28, etc.

It is found that the described chaffer assembly is equally efficient and effective in threshing light grains as, for example, alfalfa and clover, as well as the heavier grains such as oats, wheat, rye, barley and the like. Furthermore, this efficiency is maintained over widely varying yields, the described chaffer assembly having the capability of handling very large as well as relatively light and intermediate yields.

While the particular grain separator chaffer assembly herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A chaffer assembly adapted to be mounted generally horizontally across the rear end of a grain separator for reciprocation in its own plane lengthwise of the path of the straw, said chaffer assembly being operable to admit sheet-like vertical streams of air in parallel paths extending crosswise of straw flowing generally horizontally and rearwardly over the chaffer assembly and out the rear end of a grain separator and effective to agitate and levitate straw and chaff while permitting grain to fall in the space between said rising sheet-like streams of air and to escape through said chaffer assembly, said chaffer assembly having a generally rectangular frame covered by rigid sheet material corrugated crosswise of the path of straw flow, the opposite sides of said corrugations lying generally at right angles to one another with one side facing downstream and the other side facing upstream as respects the direction of straw flow, all the sides of the corrugations facing downstream having a row of large-area closely spaced openings each of which rows is effective to admit a sheet-like generally vertically disposed stream of air extending from side-to-side of said chaffer assembly, the sides of the corrugations facing upstream being substantially imperforate and being effective to channel grain falling thereon downwardly through the row of openings immediately upstream therefrom, and air deflecting means on the underside of said corrugated sheet and including means for adjustably supporting the same for adjustment in a range effective to direct air flowing rearwardly beneath said chaffer assembly upwardly through each of said rows of openings in parallel generally-vertically-disposed sheet-like streams out of contact with and lying at an acute angle to the plane of the adjacent imperforate sides of said corrugations, whereby said closely spaced parallel sheet-like streams of rising air are effective to leviate the straw flowing rearwardly without imparting substantial downstream impetus to the grain and permitting the latter to fall between said rising air streams onto the imperforate sides of said corrugations and thence through the row of air openings immediately upstream therefrom.

2. A chaffer assembly as defined in claim 1 characterized in that said air deflecting means comprises a plurality of narrow vanes having a length corresponding to the length of said rows of air openings, said adjustable supporting means including means for pivotally supporting said vanes from their upper lateral edges along an axis beneath and closely adjacent the lower edge of the associated row of air openings and with the plane of said vanes inclined acutely to the vertical with the lower edges thereof directed downwardly and toward the forward edge of said chaffer assembly.

References Cited

UNITED STATES PATENTS

| 665,332 | 1/1901 | Patten et al. | 209—394 |
| 1,928,216 | 9/1933 | Apel | 209—397 |
| 2,250,383 | 7/1941 | Koster | 209—397 |

FOREIGN PATENTS 227,083  8/1943  Switzerland.

HARRY B. THORNTON, *Primary Examiner.*

TIM R. MILES, *Examiner.*